United States Patent [19]
Yamada

[11] 3,820,120
[45] June 25, 1974

[54] RECORDER HAVING PEN ARM DRIVE MEMBERS
[75] Inventor: Kazuo Yamada, Tokyo, Japan
[73] Assignee: Yokoyawa Electric Works, Ltd., Tokyo, Japan
[22] Filed: Aug. 23, 1973
[21] Appl. No.: 390,927

[30] Foreign Application Priority Data
Sept. 6, 1972  Japan.............................. 47-89297

[52] U.S. Cl. ........................... 346/139 B, 74/89.22
[51] Int. Cl. ............................................ G01d 5/02
[58] Field of Search ............ 346/139 B, 139 R, 141; 74/89.22, 89.2

[56] References Cited
UNITED STATES PATENTS
3,546,955  12/1970  Winter et al...................... 74/89.22
3,693,180   9/1972  Hasebe et al. .................. 346/141 X Primary Examiner—Joseph W. Hartary
Attorney, Agent, or Firm—Bryan, Parmalee, Johnson & Bollinger

[57] ABSTRACT

A recording meter for recording data on a chart and adapted to dampen the effects of external vibration and shock including a pen arm, pivotally mounted at one end and equipped with a recording element at the other end, and flexible extensible and flexible inextensible driving members for driving the pen arm. The extensible driving member is coupled to one side of the pen arm and the inextensible driving member is coupled to the opposite side of the pen arm. Drive means including a servomotor, are provided to drive the extensible and inextensible driving members which in turn drive the pen arm.

Components of this recording meter are constructed so that the error due to recording data on a linear scale with a recording element that moves in an arcuate path, i.e. the scale error, is substantially equal and opposite to the error associated with the drive mechanism, i.e. the drive error. In particular, the components of this recording meter are constructed so that the linear displacement, $L_1$, of the inextensible driving member required to effect one-half scale pen arm deflection, is one-half the linear displacement, $L_2$, of that same inextensible driving member required to effect full-scale pen arm deflection.

11 Claims, 6 Drawing Figures

RECORDER HAVING PEN ARM DRIVE MEMBERS

BACKGROUND OF THE INVENTION

1. Field of the Invention

There are in general two broad types of recording meters (or chart recorders) presently known. One type is constructed with a recording element, such as a pen, mounted at one end of an arm which pivots at the opposite end about a fixed point so that the recording element moves in a circular path. The second type is arranged to move the recording element in a straight line, i.e., linearly. The pen arm in recording meters of the first type commonly is driven by a servomotor which causes the recording element, mounted at the movable end of the pen arm, to deflect through an arcuate path in proportion to the angular rotation of the servomotor shaft. The servomotor is adapted to convert an input signal into proportional shaft rotation. This first type of recording meter does not require a rotating angular-to-linear displacement transducer to obtain linear motion from the angular rotation of the servomotor shaft. Therefore, construction of the first type of recording meter is relatively simple and the meter of relatively small size. The present invention relates to recording meters of this type.

2. Description of the Prior Art

Several arrangements are presently known for driving the pen arm in a recording meter of the circular motion type described above. For example, in one such arrangement, the servomotor shaft is directly linked to the pivoted pen arm by a gear mechanism or by a rigid link mechanism. However, such construction is not wholly satisfactory. The rigid coupling employed tends to transmit external vibration and shock directly to the pen arm. Furthermore, any irregularity of motion and vibration in the rotating servomotor shaft may also be transmitted directly to the pen arm. This effect is particularly pronounced in a recording meter which utilizes a needle-dotting type recording element.

Some recording meters having pivoted pen arms are intended for use with a strip chart, that is, a chart printed on a strip of recording tape or paper. This strip chart is usually driven in a direction generally parallel to the pen arm when the pen arm is disposed in its midscale position. Frequently, the scale disposed on the strip chart is uniformly graduated on a line perpendicular to the direction of chart feed. With a pen arm constrained to move through an arcuate path, the recording element motion is non-linear with respect to such perpendicular line. Thus an error, hereinafter referred to as "scale error," results which can be considered to be negative in the scale range between 0% and 50% of full scale pen arm deflection, and positive in the scale range between 50% and 100% of full-scale pen arm deflection.

The present invention is intended to minimize certain problems in prior art recording meters which employ pivoted pen arms.

SUMMARY OF THE INVENTION

In a preferred embodiment of the present invention, to be described below in detail, the recording meter comprises a pen arm pivotally mounted at one end for deflection through an angle and equipped at its other end with a recording element. Flexible, elongate, band-like and cable-like driving members are coupled to opposite sides of the pivoting end of the pen arm, with one member being extensible and the other non-extensible. Drive means in the form of a servomotor having a drive pulley, to which the extensible and inextensible driving members are both connected for winding one driving member while unwinding the other driving member, are adapted to convert data input into rotation of the drive pulley to thereby drive the pen arm. A system of idler pulleys is provided for guiding the extensible and inextensible driving members from the drive pulley to opposite sides of the pivoting pen arm end.

By utilizing tandem driving members, one extensible and one inextensible, connected to opposite sides of the pivoted pen arm at its movable end, the recording meter of the present invention minimizes transmission of external vibration and shock to the pen arm.

An error, i.e. the "drive error," is usually characteristic of the driving mechanism in recording meters of the circular chart type. Dimensions characteristic of components of the recording meter of the present invention are chosen so that this drive error is substantially equal and opposite to the scale error. In particular, these dimensions are chosen so that the linear displacement of the inextensible driving member, $L_1$, required to effect one-half scale pen arm deflection, is equal to one-half the linear displacement of that same inextensible driving member, $L_2$, required to effect full-scale pen arm deflection.

The recording meter of the present invention is further equipped with a novel device for coupling the inextensible drive member to the pen arm. This device is mounted on the pen arm and has an arc-shaped surface against which rests the inextensible driving member. Breaking stress on this driving member is avoided by attaching it to the device at a point requiring the member to bear against the arc-shaped surface. The inextensible driving member exerts its driving force tangentially to the mounting device, but the mounting device is arranged so that the point of driving member attachment never coincides with the point of tangency.

The recording meter of the present invention further comprises a recording element adjusting mechanism for calibrating the recording element. This adjustment mechanism comprises a fixed frame mounted on the pen arm and a rotatable member coupled to the frame by a fulcrum stud. The inextensible driving member is connected to this rotatable member. An eccentric stud mounted in the rotatable member cooperates with an elongated slot in the frame to selectively rotate the rotatable member for changing and adjusting the effective length of the inextensible driving member. This selective rotation permits calibration and zero adjustment of the recording element. A locking screw is provided for securing the rotatable member once the adjustment is complete.

These and other objects, aspects, and advantages of the present invention will be pointed out in, or will be understood from the following detailed description, when considered with the accompanying drawings.

DESCRIPTION OF THE PREFERRED EMBODIMENT

Figure 1:
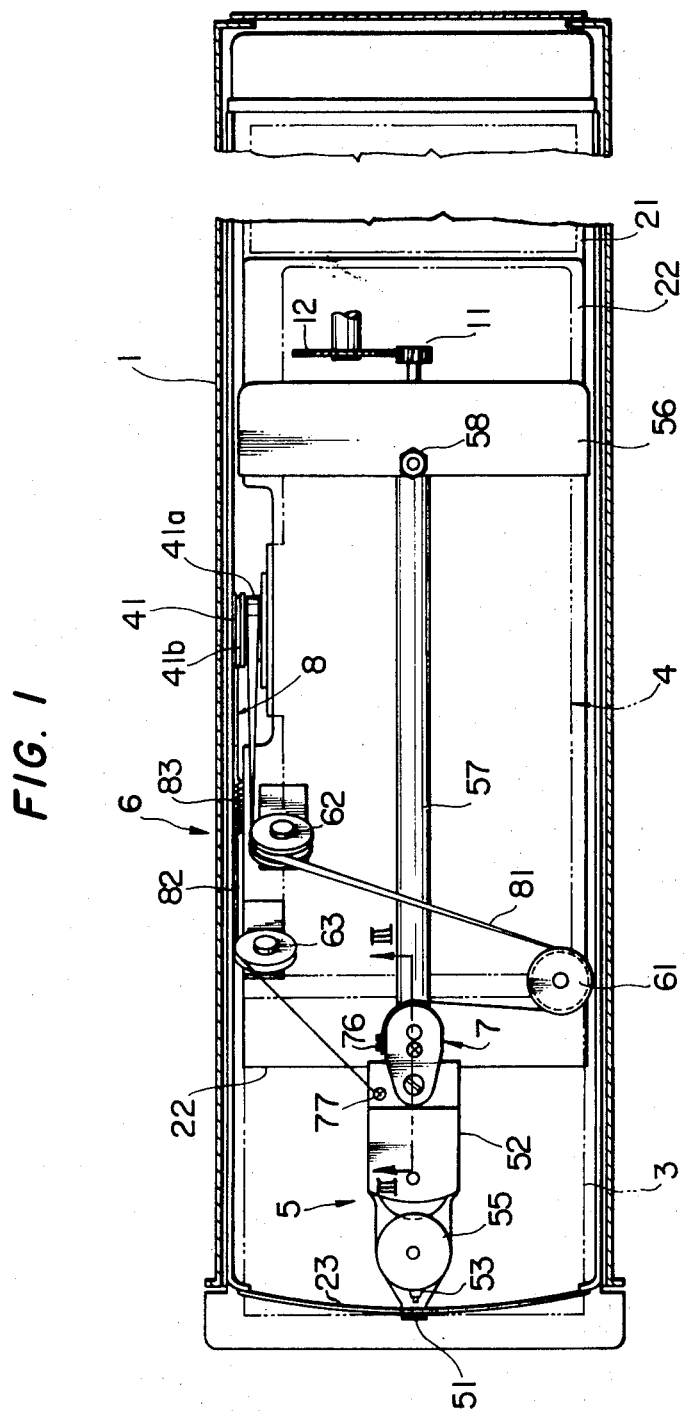
FIG. 1 is a top plan view, shown partly in crosssection, of the main components of the recording meter for recording data on a chart and adapted to dampen the effects of external vibration and shock of the present invention.
Figure 2:
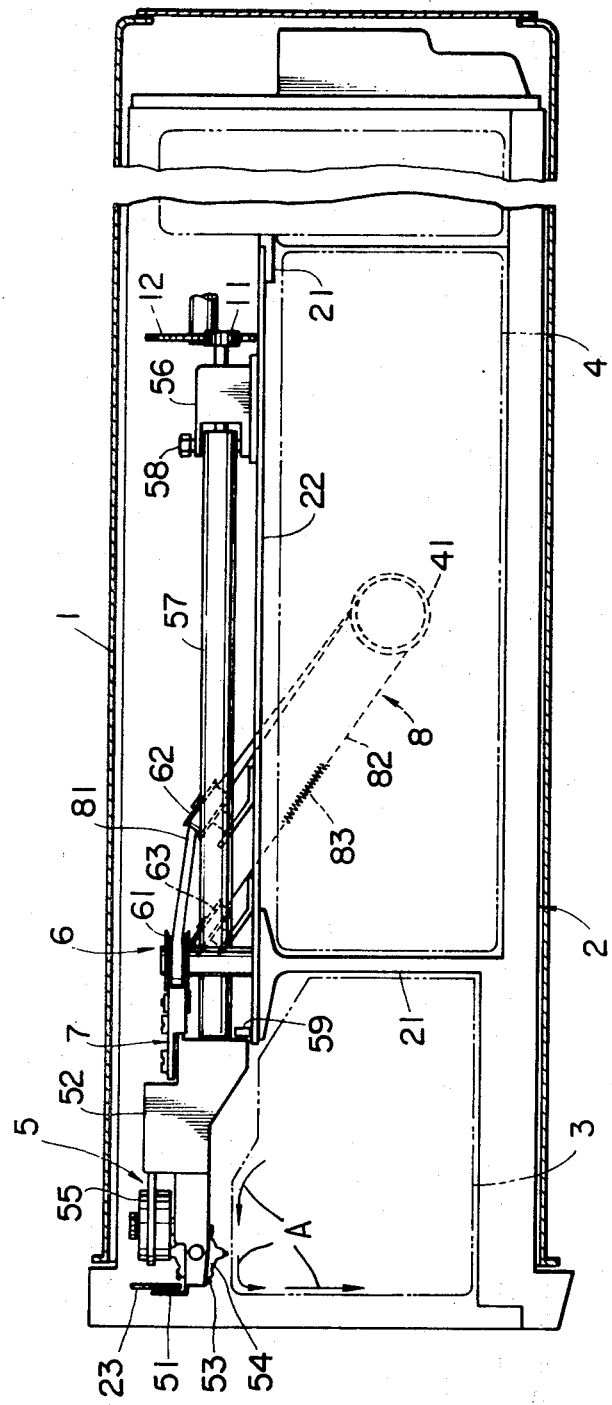
FIG. 2 is a side elevational view, also shown partly in cross-section, of the recording meter illustrated in FIG. 1.

Referring to FIGS. 1 and 2, the recording meter for recording data on a chart and adapted to dampen the effects of external vibration and shock, constructed in accordance with the preferred embodiment of the present invention, includes an external casing 1 which houses an internal support frame 2. This internal support frame 2 includes a mechanism mounting table 22 supported on a pair of columns 21. A chart feed system 3, shown diagrammatically in FIG. 2, is disposed in the front of the external casing 1 to drive a paper strip, upon which the recording chart is printed under a recording element. The direction of travel of this strip chart is indicated by arrows A in FIG. 2.

A drive mechanism 4, diagrammatically illustrated in FIGS. 1 and 2, is mounted in the external casing 1 below the mechanism mounting table 22 and includes an input circuit, an amplifier, and other electronic components, a slide resistor, and a servomotor. This drive mechanism further includes a drive pulley 41 and is adapted to receive and convert an input electrical signal into rotation of the drive pulley 41. The drive pulley may be rotated in this manner through an angle in the range of 0° to 300°.

An indicating recording mechanism, generally indicated at 5, comprises a cylindrical pen arm 57 which is pivotally mounted at one end on a rotating shaft 58. This rotating shaft is mounted in a pivot housing 56. A recording element is mounted on the cylindrical pen arm at its free end and includes a pointer 51 which cooperates with a scale 23, positioned on the external casing 1, to provide a constant visual indication of the deflection of the pen arm. The recording element further includes a dotting wheel 54, having a plurality of dotting needles 53, housed in a recording element frame 52. An ink pad 55 is mounted on the recording element frame 52 above the dotting wheel 54 to supply ink to the dotting needles 53. The recording element frame 52 is equipped with a roller 59 which cooperates with the mechanism mounted table to support the pen arm assembly and facilitate its pivoting action. The pen arm 57, the recording element frame 52 and the components mounted on it pivot freely on the rotating shaft horizontally above the mechanism mounting table.

A driving member assembly 6 is provided to couple the drive mechanism to the recording element and pen arm for effecting angular deflection of the pen arm in response to input data. This drive member assembly includes driving member means 8 coupled at one end to the drive pulley 41, guided on a system of idler pulleys 61, 62, and 63, and connected at the opposite end to the pivoted end of the pen arm. One idler pulley 61 is located on the side of the scale at which the pen arm achieves full-scale deflection. The driving member means is comprised of a flexible inextensible driving member in the form of a steel band 81 connected through the idler pulleys, 61 and 62, to one side of the pen arm at its movable end, and of a flexible extensible driving member in the form of a stranded thin metal wire band 82 connected through the idler pulley 63 to the opposite side of the pen arm at its movable end. A thin coil spring 83 is associated with the stranded metal wire band to provide its extensible characteristic.

Figure 3:
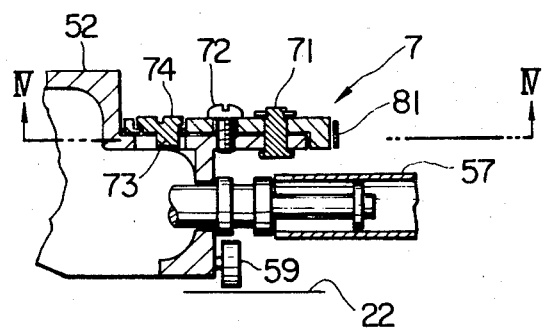
FIG. 3 is an enlarged cross-sectional view taken along line III—III of FIG. 1 illustrating the adjustment mechanism for adjusting the recording element mounted on the pen arm.
Figure 4:
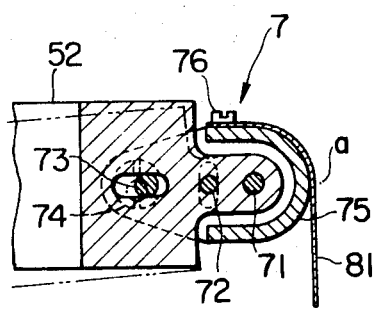
FIG. 4 is a cross-sectional view of this adjustment mechanism taken along line IV—IV in FIG. 3.

As shown in detail in FIGS. 3 and 4, a rotatable mounting plate 7 is located at the rear of the recording element frame 52 for coupling the inextensible driving member 81 to the pen arm 57. This mounting plate 7 is linked to the recording element frame 52 through a fulcrum shaft 71. An adjustment screw 74 having an eccentric stud 73 cooperates with an elongated slot disposed longitudinally in the recording element frame 52, as seen in FIG. 4, to adjustably rotate the frame 52. A locking screw 72, screwed into the frame 52 through an elongated slot formed laterally in the mounting plate 7, as shown in FIG. 4, serves to secure the rotatable frame when adjustment is complete.

The inextensible driving member 81 has one end coupled to the driving pulley 41 on the pulley's flat circumferential surface 41a and is wound clockwise about 1.5 turns on this pulley as shown in FIG. 2. The other end of the inextensible driving member is fastened to the rotatable mounting plate, which has an arc-shaped portion 75, by means of a screw 76. The driving member thus exerts its driving force longitudinally to the mounting plate 7, but the mounting plate is arranged so that the point of attachment by the screw 76 never coincides with the point of tangency.

The extensible driving member 82 is also secured at one end to the driving pulley 41 on the pulley's spool shaped portion 41b and is wound clockwise, as shown in FIG. 2, about 1 to 2 turns on this drive pulley spool 31b. The extensible driving member 82 has its other end fastened to the recording element frame 52 by a screw 77 on the side of the pen arm opposite the point of attachment of the inextensible driving member 81. An idle pulley 63 is provided to guide this driving member 82.

Rotation of the drive pulley in either direction winds one driving member and unwinds the other driving member. The steel band 81 is inextensible (nonstretchable), as noted, and serves as the reference driving member through which the torque of the drive pulley is transmitted to the pen arm 57. The stranded band 82 is extensible (stretchable) by virtue of its association with the coil spring 83, and smoothly follows the movement of the pen arm effected by the steel band 81.

The dotting needles 53 on the dotting wheel 54 may be successively selected for dotting the strip chart by an input switching mechanism in the form of a synchronous motor (not shown) coupled by a gear train of gears 11 and 12 through a shaft and universal coupling (not shown) to the dotting wheel 54.

This recording meter operates in the following manner. An electrical input signal, generated by a sensor associated with the system being monitored, is compared with a reference voltage provided on the slide resistor in the drive mechanism 4. In response, the drive pulley 41 is rotated in either the positive or negative direction depending upon the difference between the reference and input voltages. The extensible and inextensible driving members 81 and 82 are thus oppositely wound and unwound to drive the pen arm and recording element through an angle of pivoted deflection on the shaft 58. When the difference between the input voltage and the reference voltage is equal to zero, the pen arm stops at this balanced point. At this time, the value of the measured data is visually indicated on the scale 23 by the pointer 51 and is permanently recorded on the chart when dotted by a dotting needle 53.

As described, the pen arm is driven from opposite sides by the inextensible and extensible driving members. The fixed end of the inextensible driving member 81, attached to the pen arm, travels through an arcuate path depending upon the angular displacement of the pen arm 57. This displacement causes contraction or expansion strain in the inextensible driving member 81 which, however, is absorbed by the thin coiled spring 83 associated with the extensible driving member 82. This arrangement enables the pen arm 57 to swing smoothly under the driving influence of the inextensible driving member, and hence dampens external vibration and shock which might otherwise be transmitted to the pen arm 57.

A dotting needle, positioned to dot the strip chart, may be adjusted to calibrate the recording meter or to align its zero point in the following manner. The lock screw 72 is first loosened to permit rotation of the rotatable mounting plate 7. The adjusting screw 74 is then rotated causing the eccentric stud to cooperate with the elongate hole disposed in the recording element frame 52 in the fashion of a cam. Thus the rotatable mounting plate 7 and the recording element frame 52 may be rotated relative to each other as shown in FIG. 4. The adjustment changes the effective length of the inextensible driving member 81 and thus shifts the position of the recording element. Throughout such an adjustment, the inextensible driving member 81 is in contact with the arc-shaped portion 75 of the rotatable mounting plate 7. That is, the inextensible driving member 81 diverges tangentially from the arc-shaped portion of the mounting plate 7. However, the mounting plate 7 and the driving member 81 are arranged so that the point of tangency never coincides with the point at which the driving member is attached to the mounting plate. Consequently, no breaking stress is exerted on the inextensible member 81 in the region of the attachment screw 76. Thus, the likelihood that the inextensible member will break is minimized and its reliability is maximized.

The principles of operation of the present invention are described as follows with reference to FIGS. 5 and 6.

In typical recording meters of the type having a pivoted pen arm, a strip chart is fed in a direction generally parallel to the pen arm. When the pen arm is centered on the chart, one-half scale deflection is usually indicated. The zero- and full-scale deflection positions are distant from the half-scale deflection position by an angle of pen arm deflection $\theta$ (normally 10° to 15°). Usually, the scale disposed on the strip chart is linear, or uniformly-graduated upon a line perpendicular to the direction of chart feed. However, the recording element mounted at the pivoting end of a pivoted pen arm, travels through an arcuate path, when deflected at an angle proportional to the input signal. Therefore, the motion of the recording element is not linear with respect to the perpendicular line. The linearity of the scale printed on the recording chart and the non-linearity of the movement of the recording element results in a scale error. This scale error is generally negative in the region of zero- to one half-scale deflection and is generally positive in the region from one half- to full-scale deflection. This scale error may be expressed as follows:

$$\epsilon_1 = 50\{(1 - \theta/\alpha) - \sin(\alpha - \theta)/\sin \alpha\}$$

where $\theta$ = the angle of deflection of the pen arm from zero-scale position.

The maximum value of the scale error $\epsilon_1$ is most accurately found by taking the derivative of the scale error with respect to $\theta$ i.e. $d\epsilon_1/d\theta$. However, the value of the error at one quarter-scale deflection, $\epsilon_{25}$, and at three quarter-scale deflection, $\epsilon_{75}$, are generally used as the maximum and minimum values of this scale error. These quantities are given as follows:

$$\epsilon_{25} = 50\left(\frac{1}{2} - \frac{\sin\frac{\alpha}{2}}{\sin \alpha}\right)$$

$$\epsilon_{75} = 50\left(\frac{\sin\frac{\alpha}{2}}{\sin \alpha} - \frac{1}{2}\right). \qquad (3)$$

Figure 6:
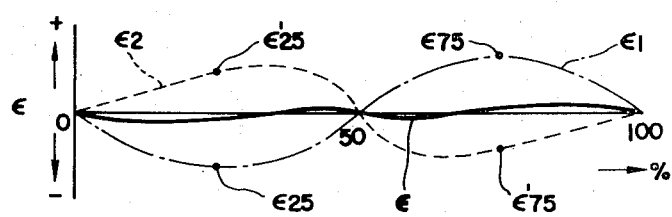
FIG. 6 is a diagram illustrating the relationship between the scale error and the drive error associated with this recording meter.

The value of the scale error $\epsilon_1$ is illustrated in FIG. 6.

Typical recording meters of this type found in the prior art are usually constructed so that the errors, $\epsilon_{25}$ 9 and $\epsilon_{75}$ fall within a specified range in relation to the pen arm deflection angle or the input signal.

In accordance with the preferred embodiment of the recording meter of the present invention, the scale error is substantially equal and opposite to a predetermined drive error characteristic of the driving mechanism. In particular, the relationship between the pen arm deflection arm $\theta$ and the displacement, L, of the inextensible driving member which causes this drive error is specified in the following manner.

Figure 5:
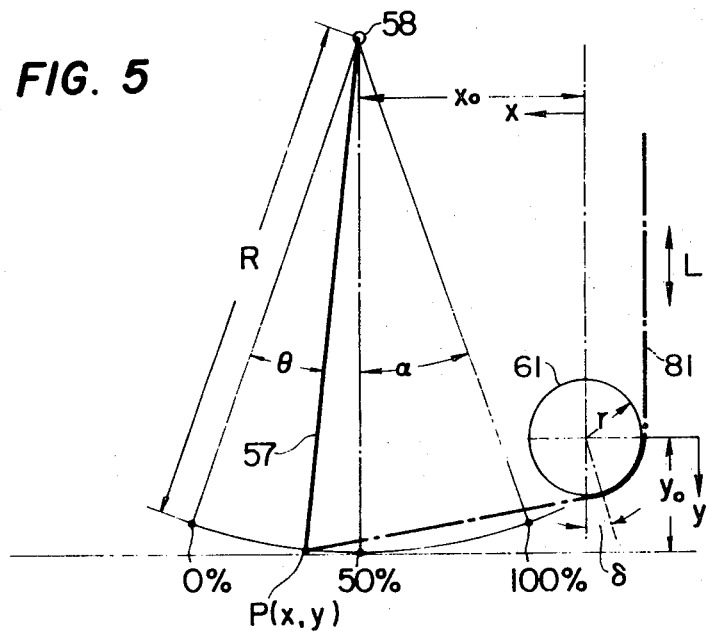
FIG. 5 is a diagram illustrating the operating principles of the recording meter constructed in accordance with the present invention.

Referring to FIG. 5, the displacement, L, of the inextensible driving member 81 from the zero-scale deflection position is given as follows:

$$L = \sqrt{x^2 + y^2 - r^2} - \sqrt{(x_0 + R\sin\alpha)^2 + y_0 - R(1 - \cos\alpha)^2 - r^2} - (\delta - \delta_0)r \qquad (4)$$

where $2\alpha$ = the full scale deflection angle of the pen arm 57 $P(x,y)$ : the point at which inextensible driving member 81 is fixed to the pen arm $R$ = the length of the pen arm 57
$r$ = the radius of the idle pulley 61
$\delta_0, \delta$ : the angles formed between the Y-axis and the point of tangency between the inextensible driving member 81 and the idle pulley 61 when the pen arm 57 is in the position of zero-scale deflection and in a given position respectively. The values of $x, y, \delta, \delta_0$, are given as follows:

$$x = x_0 + R\sin(\alpha - \theta)$$

(5)

$$y = y_0 = R\{1 - \cos(\alpha - \theta)\} \quad (6)$$

$$\delta = \cos^{-1} r / \sqrt{x^2 + y^2} - \tan^{-1} x/y \quad (7)$$

$$\delta_0 = \cos^{-1} r / \sqrt{(x_0 + R \sin\alpha)^2 + \{y_0 - R(1 - \cos\alpha)\}^2}$$

$$- \tan^{-1} x_0 + R \sin\alpha / y_0 - R(1 - \cos\alpha) \quad (8)$$

The center of the X-Y coordinate system is located at the point where the recording element rests when at one half-scale deflection, that is, in the center of the chart scale. The location of the center of the idle pulley 61, given by $x_0$ and $y_0$, may be determined after the radius $r$ of the idle pulley 61 is fixed. By specifying these parameters, the following relationship may be established: The lineal displacement $L_1$ of the inextensible driving member 81 required to effect one half-scale pen arm deflection is equal to one half the lineal displacement $L_2$ of the inextensible driving member 81 required to effect full-scale pen arm deflection. That is:

$$L_2 = 2L_1$$

The inextensible driving member moves in a direction nearly perpendicular to the pen arm. Therefore, the pen arm deflection angle, given in terms of $\Delta\theta/\Delta L$ varies within the range of $2\alpha$. This variation is large in the region of zero- and full-scale deflection and is small in the region of one half-scale deflection. In more detail, the drive error $\epsilon_2$ is generally symmetrical with respect to the scale error $\epsilon_1$; that is, it is positive in the region from zero- to one half-scale deflection and is negative in the region from one half- to full-scale deflection. Therefore, the drive error $\epsilon_2$ can substantially compensate for the scale error $\epsilon_1$, so that the total resulting error $\epsilon$, equal to the sum of the scale error $\epsilon_1$ and drive error $\epsilon_2$ becomes substantially zero. In practice, a total measured error of less than 0.05 percent results in a recording meter constructed in accordance with the present invention when $\alpha = 11°$, $R = 170$mm and $x_0 = 50$mm.

Although a specific embodiment of the invention has been disclosed in detail above, it is to be understood that this is only for the purpose of illustrating the invention and should not be construed as necessarily limiting the scope of the invention, since many changes may be made to the described structure by those skilled in the art to suit particular application.

I claim:

1. A recording meter of the type having a drive mechanism, including a servomotor, for converting input of data into rotation of a drive pulley, comprising:
   a pen arm disposed to pivot on a rotating shaft and equipped with a recording element at its movable end;
   means for feeding a recording chart relative to the recording element under the pen arm in the direction from the rotating shaft to the movable end of the recording pen arm, the recording chart having a measuring scale disposed across the chart feed direction;
   idler guide pulley means; and
   two pen arm driving members, one of which is stretchable and the other of which is nonstretchable, each having one end fastened to the drive pulley rotated by the servomotor after being wound on the outer circumference of the movable end of said pen arm by said idler pulley means, for driving said pen arm, from both sides with said driving members,
   wherein the nonstretchable driving member is wound or unwound on the drive pulley by the servomotor to cause the stretchable driving member to follow the movement of the nonstretchable driving member and wherein the pen arm is thus deflected in proportion to the rotating angle of the servomotor.

2. The recording meter as claimed in claim 1 wherein one of said driving members is a steel band; and the other of said driving members is a stranded band associated with resilient means in the form of a coil spring.

3. A recording meter as claimed in claim 1 wherein one of said driving members is a metal band and wherein said recording meter further comprises:
   a driving member attachment means mounted on said recording element, said attachment means being partly arc-shaped, said metal band being fastened to said attachment means to diverge tangentially from the arc-shaped portion thereof whereby the point of mutual attachment never coincides with the point of tangency.

4. A recording meter as claimed in claim 1 wherein said recording element and said pen arm are relatively rotatably coupled to each other, and wherein an adjustment member having an eccentric stud is associated with said recording element and said pen arm to rotatably change the position of said recording element relative to said pen arm in order to effect adjustment of said recording element.

5. A recording meter of the type having a drive mechanism, including a servomotor, for converting input of data into rotation of a drive pulley comprising:
   a pen arm disposed to pivot on a rotating shaft and equipped with a recording element at its movable end;
   means for feeding a recording chart fed relative to the recording element under the pen arm in the direction from the rotating shaft to the movable end of the recording pen arm, the recording chart having a measuring scale with uniform graduation in the direction perpendicular to the chart feed direction;
   idler pulley means, and
   two driving members, one of which is nonstretchable, attached to said pen arm on the side of full-scale deflection and the other of said driving members which is stretchable and attached to the side of said pen arm opposite said nonstretchable driving member, each of said driving members having one end fastened to the drive pulley rotated by the servomotor after being wound on the outer circumference of the drive pulley in opposite directions and each of said driving members having the other end guided to opposite sides of the movable end of said pen arm by said idler pulley means for driving said pen arm from both sides with said drive members, wherein the scale error resulting from the relationship between the measuring scale and the pen arm deflection angle is substantially compensated for by the drive error resulting from the relationship between the displacement of the nonstretchable driving member and the pen arm deflection angle.

6. A recording meter as claimed in claim 5 wherein the relationship, $2L_1 = L_2$, is established where $L_1$ and $L_2$ equal respectively the displacements made by the nonstretchable driving member when the pen arm is deflected from zero- to one half-scale and from zero- to the full-scale.

7. A recording meter for recording data on a chart and adapted to dampen the effects of external vibration and shock, comprising:
a pen arm having first and second ends;
means pivotally mounting said pen arm at said first end for deflection through an angle;
a recording element mounted at said pen arm second end;
means for feeding the recording chart under said recording element;
pen arm driving member means including flexible extensible and flexible inextensible driving members for driving said pen arm, said extensible driving member being coupled to said pen arm opposite said inextensible driving member at said second pen arm end, each of said driving members being arranged to follow said pen arm when pulled through an angle of pivoted deflection by the other of said drive members;
drive means having a drive pulley to which said extensible and said inextensible driving members are both connected for unwinding one driving member while winding the other driving member, said drive means being adapted to convert input of data into rotation of said drive pulley; and
idler pulley means for guiding said extensible and said inextensible driving members respectively from said drive means to opposite sides of said pen arm;
said drive means, said idler pulley means and said driving member means cooperating to convert rotational movement of said drive pulley into angular deflection of said pen arm.

8. The recording meter for recording observable data on a chart as claimed in claim 7, wherein:
said inextensible driving member is a metal band; and
said extensible driving member is a metal cable associated with a resilient, extensible member in the form of a coil spring.

9. The recording meter for recording observable data on a chart as claimed in claim 7 wherein:
said recording arm is equipped with an inextensible driving member attachment means, said attachment means being arc-shaped, and said inextensible driving member being fastened to said attachment means to diverge tangentially therefrom, whereby the point of mutual attachment never coincides with the point of tangency.

10. The recording meter for recording observable data on a chart as claimed in claim 7 wherein:
said pen arm is equipped with adjustment means for adjusting said recording element, said adjustment means comprising:
a recording element frame mounted on said pen arm;
a rotatable member coupled to said frame by a fulcrum stud, said inextensible driving member being connected to said rotatable member;
means for selectively variably rotating said rotatable member with respect to said frame to change and adjust the effective length of said inextensible driving member; and
lock means for relatively securing said rotatable member and said frame when adjustment is complete.

11. The recording meter for recording observable data on a chart as claimed in claim 7 wherein:
said drive means, said idle pulley means and said driving member means are arranged for effecting one-half scale deflection of said pen arm when a given linear displacement of said inextensibe driving member is effected and for effecting full-scale deflection of said pen arm when twice that given linear inextensible driving member displacement is effected, thereby compensating the linear scale error with the pen arm drive error.

* * * * *

UNITED STATES PATENT OFFICE
CERTIFICATE OF CORRECTION

Patent No. 3,820,120    Dated June 25, 1974

Inventor(s) KAZUO YAMADA

It is certified that error appears in the above-identified patent and that said Letters Patent are hereby corrected as shown below:

Column 6, line 50 reads:

" $\sqrt{(x_o + R \sin \alpha )^2 + y_o - R(1 - \cos \alpha)^2 - r^2}$ "

Should read:

-- $\sqrt{(x_o + R \sin \alpha )^2 + \{y_o - R(1 - \cos \alpha )\}^2 - r^2}$ --

Signed and sealed this 24th day of September 1974.

(SEAL)
Attest:

McCOY M. GIBSON JR.
Attesting Officer

C. MARSHALL DANN
Commissioner of Patents